US011169567B2

(12) United States Patent
Chipping

(10) Patent No.: US 11,169,567 B2
(45) Date of Patent: *Nov. 9, 2021

(54) PROTECTIVE COVERING FOR AN ELECTRONIC DEVICE

(75) Inventor: Phillip John Chipping, Sandy, UT (US)

(73) Assignee: ZAGG Inc, Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,619

(22) Filed: Jun. 6, 2011

(65) Prior Publication Data
US 2011/0236629 A1    Sep. 29, 2011

Related U.S. Application Data

(63) Continuation of application No. 11/681,665, filed on Mar. 2, 2007, now Pat. No. 7,957,524.
(Continued)

(51) Int. Cl.
*A45C 11/00* (2006.01)
*G06F 1/16* (2006.01)
(Continued)

(52) U.S. Cl.
CPC ............ *G06F 1/1626* (2013.01); *A45C 11/00* (2013.01); *G06F 1/1616* (2013.01); *G06F 1/1656* (2013.01); *G06F 2200/1633* (2013.01); *H04M 1/0283* (2013.01); *H04M 1/185* (2013.01); *Y10T 428/2419* (2015.01); *Y10T 428/24264* (2015.01); *Y10T 428/24331* (2015.01); *Y10T 428/24777* (2015.01); *Y10T 428/28* (2015.01)

(58) Field of Classification Search
CPC .... G06F 1/1626; G06F 1/1616; G06F 1/1656; G06F 2200/1633; A45C 11/00; A45C 2011/002; A45C 2011/003; H01M 1/0283; H01M 1/185
USPC ........ 206/320, 497, 811, 305; 150/161, 162, 150/165, 154; 379/428.01, 437; 455/575.01; 428/41.7
See application file for complete search history.

(56) References Cited

U.S. PATENT DOCUMENTS 2,095,437 A    10/1937    Fox
2,742,145 A     4/1956    Blackburn et al.
(Continued)

FOREIGN PATENT DOCUMENTS

DE    20101039 U1    5/2001
EP    0 539 099 A2    4/1993
(Continued)

OTHER PUBLICATIONS

"Plastic Films"; Technology and Packaging Applications, 1990. A book by Kenton R. Osborn & Wilmer A. Jenkins.*
(Continued)

*Primary Examiner* — Steven A. Reynolds
(74) *Attorney, Agent, or Firm* — Dentons Durham Jones Pinegar

(57) ABSTRACT

A protective cover for electronic devices. A device is examined and a film is prepared. The film may include multiple pieces and may have cutouts for discontinuities in the surfaces of the device or to accommodate a user interface. The corners or other portions of the films are then cut such that the films substantially cover the surface of the device without bunching or creating air pockets.

31 Claims, 7 Drawing Sheets

Related U.S. Application Data

(60) Provisional application No. 60/778,339, filed on Mar. 2, 2006.

(51) Int. Cl.
*H04M 1/18* (2006.01)
*H04M 1/02* (2006.01)

(56) References Cited

U.S. PATENT DOCUMENTS

| | | |
|---|---|---|
| 2,906,397 A | 9/1959 | Simmons |
| 3,086,647 A | 4/1963 | Krezanoski |
| 3,629,034 A | 12/1971 | Kuroda |
| 3,800,022 A * | 3/1974 | Buteux ............... 264/210.1 |
| 4,093,759 A * | 6/1978 | Otsuki et al. ........... 428/34.7 |
| 4,151,319 A | 4/1979 | Sackoff et al. |
| 4,292,481 A * | 9/1981 | Barnes ................ H04M 1/21 |
| | | 379/441 |
| 4,901,852 A * | 2/1990 | King .................. B65D 65/02 |
| | | 206/320 |
| 5,132,588 A * | 7/1992 | Warman .................... 313/479 |
| 5,214,794 A * | 5/1993 | Van Wijnen ........ G08B 3/1058 |
| | | 341/176 |
| 5,335,675 A * | 8/1994 | Wheeler et al. ............ 128/842 |
| RE35,318 E | 8/1996 | Warman |
| 5,677,050 A * | 10/1997 | Bilkadi et al. .............. 428/331 |
| 5,730,644 A | 3/1998 | Pfanstiehl |
| 5,732,414 A | 3/1998 | Monica |
| 5,820,957 A | 10/1998 | Schroeder et al. |
| 5,922,427 A | 7/1999 | King |
| 6,017,079 A | 1/2000 | Warner |
| 6,082,535 A * | 7/2000 | Mitchell .................... 206/320 |
| 6,109,434 A * | 8/2000 | Howard, Jr. ......... G06F 1/1601 |
| | | 206/320 |
| 6,129,929 A | 10/2000 | Wick |
| 6,142,868 A | 11/2000 | Pfanstiehl |
| 6,178,680 B1 | 1/2001 | Sloot |
| 6,201,867 B1 * | 3/2001 | Koike ................. H04M 1/0283 |
| | | 379/433.11 |
| 6,227,599 B1 | 5/2001 | Campfield et al. |
| 6,250,765 B1 | 6/2001 | Murakami |
| 6,372,313 B1 | 4/2002 | D'Alessio et al. |
| 6,408,132 B1 | 6/2002 | Ishikawa |
| 6,471,056 B1 * | 10/2002 | Tzeng .................... A45C 11/00 |
| | | 150/154 |
| 6,491,775 B1 | 12/2002 | Janssen et al. |
| 6,526,959 B1 | 3/2003 | Lee et al. |
| 6,596,400 B1 * | 7/2003 | Friedman et al. ........... 428/441 |
| 6,608,996 B1 * | 8/2003 | Laurikka ............ H04M 1/0279 |
| | | 340/7.55 |
| 6,613,411 B2 * | 9/2003 | Kollaja et al. ............. 428/40.1 |
| 6,614,423 B1 * | 9/2003 | Wong et al. ................. 345/173 |
| 6,620,281 B1 * | 9/2003 | Sommers .................... 156/248 |
| 6,634,494 B1 * | 10/2003 | Derr .................... G01D 11/24 |
| | | 206/305 |
| 6,646,864 B2 * | 11/2003 | Richardson .......... G06F 1/1626 |
| | | 206/305 |
| 6,660,388 B2 | 12/2003 | Liu et al. |
| 6,701,159 B1 * | 3/2004 | Powell .................. A45C 11/00 |
| | | 379/446 |
| 6,733,863 B1 | 5/2004 | Mizuno et al. |
| 6,752,430 B2 * | 6/2004 | Holt et al. ..................... 283/72 |
| 6,800,378 B2 | 10/2004 | Hawa et al. |
| 6,802,416 B1 | 10/2004 | D'Alessio et al. |
| 6,831,714 B2 * | 12/2004 | Masaki et al. ................ 349/112 |
| 6,841,190 B2 * | 1/2005 | Liu et al. ....................... 427/64 |
| 6,878,425 B1 | 4/2005 | Gomes |
| 6,914,774 B1 | 7/2005 | Albertini et al. |
| 6,960,040 B2 * | 11/2005 | D'Alessio et al. ........... 401/125 |
| 6,975,888 B2 * | 12/2005 | Buesseler et al. ........... 455/575.1 |
| 7,016,008 B2 | 3/2006 | Jung et al. |
| 7,351,470 B2 | 4/2008 | Draheim et al. |
| 7,389,869 B2 * | 6/2008 | Mason, Jr. .................... 206/230 |
| 7,529,364 B2 * | 5/2009 | Buehler ......................... 379/451 |
| 7,558,594 B2 * | 7/2009 | Wilson ........................ 455/550.1 |
| 7,729,493 B2 | 6/2010 | Krieger et al. |
| 7,781,610 B2 * | 8/2010 | Schneider et al. ............ 560/129 |
| 7,784,610 B2 | 8/2010 | Mason |
| D623,180 S | 9/2010 | Diebel |
| D623,638 S | 9/2010 | Richardson et al. |
| D623,639 S | 9/2010 | Richardson et al. |
| D624,910 S | 10/2010 | Richardson et al. |
| D632,686 S | 2/2011 | Magness et al. |
| 7,912,520 B2 | 3/2011 | Choi et al. |
| D638,412 S | 5/2011 | Lee |
| D638,414 S | 5/2011 | Magness et al. |
| D639,286 S | 6/2011 | Mohoney |
| 7,957,524 B2 * | 6/2011 | Chipping ................. 379/428.01 |
| D641,348 S | 7/2011 | Kim et al. |
| D644,218 S | 8/2011 | Akana et al. |
| 7,991,440 B2 | 8/2011 | Liu et al. |
| D647,519 S | 10/2011 | Rothbaum et al. |
| 2002/0036228 A1 * | 3/2002 | Reese et al. ..................... 229/4.5 |
| 2002/0076512 A1 * | 6/2002 | Kreider ............... H04M 1/0283 |
| | | 428/34.1 |
| 2002/0086702 A1 * | 7/2002 | Lai ....................... G06F 1/1626 |
| | | 455/556.2 |
| 2002/0114934 A1 | 8/2002 | Liu et al. |
| 2002/0137474 A1 * | 9/2002 | Wu ......................... H01Q 1/526 |
| | | 455/575.8 |
| 2002/0197069 A1 * | 12/2002 | Tomizawa .......................... 396/6 |
| 2003/0150756 A1 * | 8/2003 | Kajiya .................... A45C 13/02 |
| | | 206/320 |
| 2004/0170817 A1 | 9/2004 | Fox et al. |
| 2004/0246386 A1 * | 12/2004 | Thomas et al. ................ 348/818 |
| 2005/0022924 A1 * | 2/2005 | Blackburn ..................... 156/230 |
| 2005/0025924 A1 * | 2/2005 | Toyama ....................... 428/40.1 |
| 2005/0047589 A1 * | 3/2005 | Chang .............................. 379/452 |
| 2005/0116334 A1 * | 6/2005 | Buehler ................. H04B 1/3888 |
| | | 257/704 |
| 2005/0168697 A1 | 8/2005 | Bruzzone et al. |
| 2005/0229653 A1 * | 10/2005 | Trinh .......................... C11D 3/001 |
| | | 68/237 |
| 2006/0037507 A1 * | 2/2006 | Trigg et al. ....................... 101/483 |
| 2006/0040081 A1 * | 2/2006 | Hodsdon ....................... G09F 3/02 |
| | | 428/40.1 |
| 2006/0154029 A1 * | 7/2006 | Antonini ........................ 428/141 |
| 2006/0177641 A1 * | 8/2006 | Breese et al. ................... 428/220 |
| 2006/0186001 A1 | 8/2006 | Anderson et al. |
| 2006/0222801 A1 * | 10/2006 | Mase ............................. 428/40.1 |
| 2006/0292319 A1 * | 12/2006 | Kurashina et al. .......... 428/32.64 |
| 2007/0026234 A1 * | 2/2007 | Mase ........................... 428/411.1 |
| 2007/0229962 A1 * | 10/2007 | Mason, Jr. ..................... 359/609 |
| 2008/0099152 A1 | 5/2008 | Nakamura |
| 2008/0196804 A1 | 8/2008 | Hsu |
| 2009/0009945 A1 | 1/2009 | Johnson et al. |
| 2009/0050499 A1 | 2/2009 | Calco et al. |
| 2009/0086415 A1 * | 4/2009 | Chipping .................... 361/679.01 |
| 2009/0186181 A1 | 7/2009 | Mase |
| 2009/0301907 A1 * | 12/2009 | Mason ............................ 206/223 |
| 2009/0325657 A1 * | 12/2009 | Ramsdell et al. ............ 455/575.8 |
| 2010/0028586 A1 * | 2/2010 | Enlow et al. .................... 428/41.3 |
| 2010/0270189 A1 * | 10/2010 | Pedersen et al. ............... 206/320 |
| 2011/0267793 A1 | 11/2011 | Cohen et al. |

FOREIGN PATENT DOCUMENTS

| | | |
|---|---|---|
| EP | 1 557 452 A1 | 7/2005 |
| KR | 2000-0013715 | 12/2000 |
| WO | 2003/036454 A1 | 5/2003 |
| WO | 2007/046637 A1 | 4/2007 |

OTHER PUBLICATIONS

Phillip John Chipping "Declaration of Phillip John Chipping" Declaration of Inventorship executed Apr. 27, 2010, filed in U.S. Appl. No. 11/681,665, filed May 3, 2010, including Exhibits 1-61: Exhibit 1: File listing from Chipping's home computer showing Feb. 24, 2005, creation date of Adobe Photoshop file "before_after_small" Exhibit 2: Image of "before_after_small" file Exhibit 3: File listing from Chipping's home computer showing Mar. 28, 2005,

(56) References Cited

OTHER PUBLICATIONS creation date of Adobe Illustrator file "the_shield_ai" Exhibit 4: Image of " the_shield_ai " file showing Chippings business card designs Exhibit 5: Zoomed-in image of bottom left portion of " the_shield_ai " file Exhibit 6: File listing from Chipping's home computer showing Mar. 28, 2005, creation date of Adobe Illustrator file "business cards to print for retail—single.ai" Exhibit 7: Image of "business cards to print for retail—single.ai" file Exhibit 8: File listing from Chipping's home computer showing Apr. 14, 2005, creation date of business website "aboutfilm.html" Exhibit 9: Image of "aboutfilm.html" file Exhibit 10: File listing from Chipping's home computer showing various .gif and .html computer files with creation dates in Apr. 2005 Exhibit 11: Chipping's Excel spreadsheet used to record transactions from the website beginning Apr. 22, 2005 Exhibit 12: File listing from Chipping's home computer showing May 6, 2005, creation date of sales website "ipod2.html" Exhibit 13: Image of "ipod2.html" file Exhibit 14: Image of Internet Archive "www.archive.org/web/web.php" Exhibit 15: Image from Internet Archive showing "http://www.we-got-you-covered.com" as of May 9, 2005.

Exhibit 16: Image of home page for "http://www.we-got-you-covered.com" as it was archived by Internet Archive as of May 9, 2005 Exhibit 17: File listing from Chipping's home computer showing May 9, 2005, creation date of website "index.html"Exhibit 18: Image of "index.html" file Exhibit 19: Image of "iPod screens"link from home page for "http://www.we-got-you-covered.com" as it was archived by Internet Archive as of May 9, 2005 Exhibit 20: File listing from Chipping's home computer showing May 6, 2005, creation date of Adobe Illustrator file "ipod mini full-body shield.ai"Exhibit 21: Image of "ipod mini full-body shield.ai" file Exhibit 22: File listing from Chipping's home computer showing May 10, 2005, creation date of Adobe Illustrator file "iPod reg full-body shield 2.ai" Exhibit 23: Image of "iPod reg full-body shield 2.ai"file Exhibit 24: File listing from Chipping's home computer showing May 14, 2005, creation date of Adobe Illustrator file "shield—iPod reg (full-body).ai" Exhibit 25: Image of "shield—iPod reg (full-body).ai" file Exhibit 26: File listing from Chipping's home computer showing Jul. 1, 2005, creation date of Adobe Illustrator file "shield—iPod reg 40 & 60 gig (full-body).ai" Exhibit 27: Image of "shield—iPod reg 40 & 60 gig (full-body).ai" file Exhibit 28: File listing from Chipping's home computer showing Jun. 2, 2005, creation date of Adobe Illustrator file "iPod—20 & 30 GB—full body—pic explanation.ai" Exhibit 29: Image of "iPod—20 & 30 GB—full body—pic explanation.ai" file Exhibit 30: File listing from Chipping's home computer showing Jul. 22, 2005, creation date of file "product-picture.gif"Exhibit 31: Image of "product-picture.gif" file Exhibit 32: File listing from Chipping's home computer showing Jun. 2,2005, creation date of Adobe Illustrator file "header card—ipod—to print.ai" Exhibit 33: Image of "header card—ipod—to print.ai" file Exhibit 34: Image showing the existence of "http://www.theinvisibleshield.com"in Internet Archive's records as it existed on Jul. 2, 2005 Exhibit 35: Image showing Internet Archive record of "http://www.theinvisibleshield.com" website on Jul. 2, 2005 Exhibit 36: Image of "http://www.theinvisibleshield.com" home page as archived Jul. 2, 2005 by Internet Archive Exhibit 37: Jul. 7,2005 Press Release listing exhibitors, issued by MacWorld Conference & Expo held Jul. 11-14, 2005 at the Hynes Convention Center in Boston, Massachusetts, United States Exhibit 38: The Mac Observer, photograph taken at MacWorld Conference & Expo, posted at "http://www.macobserver.com/gallery_albums/MWBOS2005DAY1/DSCN5106.jpg" Exhibit 39: Blog by Rainy Day posted Jul. 13, 2005 at "http://www.rainydaymagazine.com/RDM2005/RDMHomeJuly2005.htm" Exhibit 40: File listing from Chipping's home computer showing Jul. 21, 2005, creation date of file "scratchedipod-big.gif".

Exhibit 41: Image of "scratchedipod-big.gif" file Exhibit 42: John G. Spooner "The iPod's Economy Is Booming" pcmag.com posted online at www.pcmag.com on Jul. 13, 2005 Exhibit 43: Dan Frakes on behalf of Playlist Magazine "Macworld Expo Boston from an iPod's point of view"posted online at www.macworld.com on Jul. 15, 2005 http://www.macworld.com/article/45891/2005/07/2005bostonexproipod.html Exhibit 44: Chuck Joiner "Roving Reporter: Notes from Macworld Boston"posted online at www.macsimumnews.com on Jul. 23, 2005 Exhibit 45: Garrett Harding Blog posting at "Harding's BLOG" on Aug. 19, 2005 Exhibit 46: The MUG Center: The Mac User Group Resource Site "The User Group Report: Day 2 at Macworld Expo: Initial Show Floor Walk-Through, Invisible Shield, Old Friends and Two Berklee Students Perform Live" posted online on Jul. 13, 2005 at http//www.mugcenter.com/usergroupreport/2005/MWBoston2.html Exhibit 47: Transcript of interview of Chipping by Chuck Joiner at Macworld Boston 2005 publicly available Jul. 13, 2005. Archived recording of interview available online at http://www.usergroupreport.com/MP3/2005/UGRMWBoston052.mp3 Exhibit 48: Louis DiCarro posting on www.macradio.com on Jul. 13, 2005 referencing interview with Chipping Exhibit 49: Jul. 8, 2005, posting at www.prweb.com stating an archived recording of DiCarro interview of Chipping available online at http://media.macradio.com/mp3s/mwbh05_1312.mp3 Exhibit 50: Transcript of DiCarro's interview of Chipping. Archived recording of interview available at http://media.macradio.com/mp3s/mwbh05_1312.mp3. Exhibit 51: Wan Chi Lau "Gear & Gadgets . . . " Rainy Day Magazines published online in portions on Sep. 18, 22 and 27, 2005 at http://www.rainydaymagazine.com/RDM2005/GearNGadgets/September2005/RDMGG_InvisibleShieldFirstLook.htm Exhibit 52: Images from www.rainydaymagazine.com showing Sep. 2005 posting dates of "Gear & Gadgets" Exhibit 53: Ilene Hoffman review of Invisible Shield published online Nov. 18, 2005 at www.macnn.com available at http://www.macnn.com/reviews/invisibleshield-for-ipod.html Exhibit 54: Jim Rossman "Accessorize the iPod" The Dallas Morning News Nov. 26, 2005 available online at http://www.dallasnews.com/sharedcontent/ptech/generalstories2/112605ccdrptechtechipod.295febe7.html Exhibit 55: B.J. Abernaethy "iPod Garage Nanobook" Holiday 2005 edition Exhibit 56: Product review testimonial by various users posted online Apr. 28, 2006 at http://web.archive.org/web/20060428090923/www.shieldzone.com/testimony/index.html Exhibit 57: Press release by Protective Solutions, Inc. "First Invisible Scratch Protector/Case for New Apple iPod nano Available from Protective Solutions" published online bywww.businesswire.com on Sep. 21, 2005 Exhibit 58: Brice Wallace "Firm seeks a scratch-free world" Deseret News published Dec. 19, 2005 Exhibit 59: Press release issued by ZAGG Incorporated "ZAGG Reports Third Quarter Financial Results Revenue Increased 76% Year over Year" published online by www.businesswire.com on Nov. 14, 2007 Exhibit 60: Image from www.bestskinsever.com in Oct. 2005 Exhibit 61: Image from www.bodygaurdz.com in Jan. 2007.

3M "Scotchal™ Translucent Graphic Film" Product Bulletin 8628 Release date Sep. 2009.

3M "Scotchal™ High Performance Striping and Graphics: Application, Maintenance and Removal for Professional Applicators—Instruction Bulletin 2-13" Feb. 2000.

Case No. 2:11-cv-00517-PMW "Complaint" filed by Plaintiff ZAGG Intellectual Property Holding Co., Inc. In the United States District Court, District of Utah, Central Division Jun. 7, 2011 Exhibit A: U.S. Pat. No. 7,957,524 Exhibit B: Assignment to ZAGG Intellectual Property Holding Co., Inc.

Case No. 2:11-cv-00517-PMW "First Amended Complaint" filed by Plaintiff ZAGG Intellectual Property Holding Co., Inc. In the United States District Court, District of Utah, Central Division Jul. 20, 2011.

Case No. 2:11-cv-00517-PMW "Defendant United SGP Corp's Answer to First Amended Complaint" filed by Defendant United SGP Corp. In the United States District Court, District of Utah, Central Division Aug. 8, 2011.

Case No. 2:11-cv-00517-PMW "Wrapsol LLC's Answer, Affirmative Defenses and Counterclaims to Plaintiff's First Amended Complaint" filed by Defendant Wrapsol LLC In the United States District Court, District of Utah, Central Division Aug. 8, 2011.

Case No. 2:11-cv-00517-PMW "Defendants NLU Products, L.L.C., Fusion of Ideas, Inc., Ghost Armor LLC and Skinomi LLC's Answer and Counterclaims" filed by Defendants NLU Products,

(56) References Cited

OTHER PUBLICATIONS

L.L.C., Fusion of Ideas, Inc., Ghost Armor LLC and Skinomi LLC In the United States District Court, District of Utah, Central Division Aug. 19, 2011.
Case No. 2:11-cv-00517-PMW "ZAGG Intellectual Property Holding Co., Inc.'s Answer to Defendant United SGP Corp.'s Counterclaim" filed by Plaintiff ZAGG Intellectual Property Holding Co., Inc. In the United States District Court, District of Utah, Central Division Aug. 29, 2011.
Case No. 2:11-cv-00517-PMW "ZAGG Intellectual Property Holding Co., Inc.'s Answer to Defendant Wrapsol LLC's Counterclaim" filed by Plaintiff ZAGG Intellectual Property Holding Co., Inc. In the United States District Court, District of Utah, Central Division Aug. 29, 2011.
Case No. 2:11-cv-00517-PMW "ZAGG Intellectual Property Holding Co., Inc.'s Answer to Defendant NLU Products, L.L.C., Fusion of Ideas, Inc., Ghost Armor LLC and Skinomi LLC's Counterclaim" filed by Plaintiff ZAGG Intellectual Property Holding Co., Inc. In the United States District Court, District of Utah, Central Division Sep. 9, 2011.
Case No. 2:11-cv-00517-PMW "Defendant Best Skins Ever's Answer and Counterclaims" filed by Defendant Best Skins Ever In the United States District Court, District of Utah, Central Division Sep. 20, 2011.
Case No. 2:11-cv-00517-PMW "Answer and Counterclaims of PEDCO, LLC" filed by Defendant PEDCO, LLC In the United States District Court, District of Utah, Central Division Oct. 4, 2011.
Case No. 2:11-cv-00517-PMW "ZAGG Intellectual Property Holding Co., Inc.'s Answer to Defendant Best Skins Ever's Counterclaim" filed by Plaintiff ZAGG Intellectual Property Holding Co., Inc. In the United States District Court, District of Utah, Central Division Oct. 14, 2011.
Case No. 2:11-cv-00517-PMW "ZAGG Intellectual Property Holding Co., Inc.'s Answer to Defendant PEDCO, LLC.'s Counterclaim" filed by Plaintiff ZAGG Intellectual Property Holding Co., Inc. In the United States District Court, District of Utah, Central Division Oct. 28, 2011.
Protective Solutions, Inc. "We Got You Covered" website www.we-got-you-covered.com available at http://web.archive.org/web/20050509134536/http://www.we-got-you-covered.com, archived May 2005 (last visited Jun. 11, 2012).
Protective Solutions, Inc. "We Got You Covered" website www.we-got-you-covered.com/ipod available at http://web.archive.org/web/20050509162817/http://www.we-got-you-covered.com/ipod.html, archived May 2005 (last visited Jun. 11, 2012).
Protective Solutions, Inc. "We Got You Covered" website www.we-got-you-covered.com/aboutfilm available at http://web.archive.org/web/20050509163117/http://www.theinvisibleshield.com/, archived May 2005 (last visited Jun. 11, 2012).
Protective Solutions, Inc. "We Got You Covered" website www.theinvisibleshield.com available at http://web.archive.org/web/20050702012158/http://www.theinvisibleshield.com/aboutfilm.html, archived Jul. 2005 (last visited Jun. 11, 2012).
Protective Solutions, Inc. "We Got You Covered" website www.theinvisibleshield.com/aboutfilm available at http://web.archive.org/web/20050721234906/http://www.theinvisibleshield.com/aboutfilm.html, archived Jul. 2005 (last visited Jun. 11, 2012).
Protective Solutions, Inc. "We Got You Covered" website www.theinvisibleshield.com/ipod available at http://web.archive.org/web/20050722000053/http://www.theinvisibleshield.com/ipod.html, archived Jul. 2005 (last visited Jun. 11, 2012).
InvisibleSHIELD "the ULTIMATE screen protector" website www.theinvisibleshield.com/application available at http://web.archive.org/web/20051022000539/http://www.theinvisibleshield.com/application.html, archived Oct. 2005 (last visited Jun. 11, 2012).
InvisibleSHIELD "About Screen Protector Film" website www.theinvisibleshield.com/index.asp?PageAction . . . available at http://web.archive.org/web/20051218204154/http://www.theinvisibleshield.com/index.asp?PageAction=Custom&ID=14, archived Dec. 2005 (last visited Jun. 11, 2012), archived May 2005 (last visited Jun. 11, 2012).
InvisibleSHIELD "Application" website www.theinvisibleshield.com/index.asp?PageAction=Custom&ID=6 available at http://web.archive.org/web/20060203164234/http://www.theinvisibleshield.com/index.asp?PageAction=Custom&ID=6, archived Feb. 2006 (last visited Jun. 11, 2012).
ShieldZone Corporation "Home of the iPod Screen Protector: FAQ" website www.shieldzone.com/faq/index , available at http://web.archive.org/web/20060424023714/http://www.shieldzone.com/faq/index.htmlarchived Apr. 2006 (last visited Jun. 11, 2012).
ShieldZone Corporation "Home of the iPod Screen Protector: Application instructions" website www.shieldzone.com/app_instructions/index available at http://web.archive.org/web/20060424023757/http://www.shieldzone.com/app_instructions/index.html, archived Apr. 2006 (last visited Jun. 11, 2012).
ShieldZone Corporation "Home of the iPod Screen Protector" website www.shieldzone.com/store/index available at http://web.archive.org/web/20060428033759/http://www.shieldzone.com/store/index.html, archived Apr. 2006 (last visited Jun. 11, 2012).
ShieldZone Corporation "Home of the iPod Screen Protector: FAQ" website www.shieldzone.com/faq/index available at http://web.archive.org/web/20060502022439/http://www.shieldzone.com/faq/index.html, archived May 2006 (last visited Jun. 11, 2012).
ShieldZone Corporation "Home of the iPod Screen Protector: About ShieldZone" website www.shieldzone.com/company/aboutus available at http://web.archive.org/web/20060502022620/http://www.shieldzone.com/company/aboutus.html, archived May 2006 (last visited Jun. 11, 2012).
ShieldZone Corporation "Home of the iPod Screen Protector: Application instructions" website www.shieldzone.com/app_instructions/index available at http://web.archive.org/web/20060504050048/http://www.shieldzone.com/app_instructions/index.html, archived May 2006 (last visited Jun. 11, 2012).
ShieldZone Corporation "Home of the iPod Screen Protector: Application instructions" website www.shieldzone.com/app_instructions/index available at http://web.archive.org/web/20060705100135/http://www.shieldzone.com/app_instructions/index.html, archived Jul. 2006 (last visited Jun. 11, 2012).
ShieldZone Corporation "Home of the iPod Screen Protector: Application instructions" website www.shieldzone.com/app_instructions/index available at http://web.archive.org/web/20060717181400/http://www.shieldzone.com/app_instructions/index.html, archived Jul. 2006 (last visited Jun. 11, 2012).
ShieldZone Corporation "Home of the iPod Screen Protector: Application instructions" website www.shieldzone.com/app_instructions/index available at http://web.archive.org/web/20060909002223/http://www.shieldzone.com/app_instructions/index.html, archived Sep. 2006 (last visited Jun. 11, 2012).
IPodlounge "Buyer's Guide 2004" Issue 01, Nov. 2004.
Tocken Wrapper, Protetive film for iPod Shuffle; www.tocken.co.kr; 2004-2005.
3M "Polyurethane Protective Tape: Preparation and Application Instructions" Technical Bulletin Oct. 2001.
Auto Paint Guard Automobile Clear Bra—Protecting Your Investment website archived at http://web.archive.org/web/20050728232723/http://www.autopaintguard.com/installation.html Jul. 2005.
Tocken Wrapper for iPod mini: http://caizer.com/?mid_tech&page=22&document_srl=20234&listStyle=&page=; Feb. 18, 2005.
http://www.enfun.net/technique/review/?step=20&dataSeqNo=42417; Jan. 13, 2005.
Statement by Min-Woo Seo of Samsung Electronics Co., Ltd., Mar. 10, 2010.
http://www.appleforum.com; AppleForum; Jul.-Nov. 2005.
WITHIPOD Community for Korean Ipod Users; http://withipod.net/?mid=podmagazine_notice&category=2078464&search_keyboard=tocken&search_target=title&document_srl=2078532; Nov. 22, 2004.
Tocken Wrapper, User's Review: WITHIPOD Community for Korean Ipod Users; http://www.withipod.net/bbs/zboard/php?id=community_ipod_gallery&no=1224; Mar. 24, 2005.

(56) References Cited

OTHER PUBLICATIONS

Tocken Wrapper, User's Review: WITHIPOD Community for Korean Ipod Users; http://www.withipod.net/bbs/zboard/php?id=community_ipod_gallery&no=1188; Mar. 21, 2005.

MacMadang "I hate the Same thing though it is pretty!:TOCKEN Wrapper" Magazine vol. 162 Jul. 1, 2005.

Users review of Noxk PSP protection film from internet website; http://raven.egloos.com/1076693; Jul. 25, 2005.

Tocken Wrapper sales bulletin published at http://kmug.co.kr; Sep. 11, 2005.

Crandall/Dahl/Lardner "An Introduction to the Mechanics of Solids" Jan. 25, 1996; pp. 273-276.

Case No. 2008 Dang 3751 and 2009 Dang 1523; Presentation for Oral Hearing for Invalidation and Scope Confirmation Trial of Registered Patent No. 784501; Kim & Chang Mar. 16, 2010.

Case No. 2008 Dang 3751 and 2009 Dang 1523; Seung-Kyun Oh (president of Korean distributor for ZAGG); Brief for Invalidation and Scope Confirmation Trial of Registered Patent No. 784501; Sep. 18, 2009; English translation only.

Case No. 2008 Dang 3751 and 2009 Dang 1523; Seung-Kyun Oh (president of Korean distributor for ZAGG); Brief for Invalidation and Scope Confirmation Trial of Registered Patent No. 784501 Oct. 14, 2009.

Case No. 2008 Dang 3751 and 2009 Dang 1523; SGP Brief for Invalidation and Scope Confirmation Trial of Registered Patent No. 784501; Oct. 14, 2009.

Case No. 2008 Dang 3751 and 2009 Dang 1523; Seung-Kyun Oh (president of Korean distributor for ZAGG); Brief for Invalidation and Scope Confirmation Trial of Registered Patent No. 784501 Nov. 14, 2009.

U.S. Patent and Trademark Office, "Office Action in Inter Partes Reexamination" Reexamination Proceedings regarding U.S. Pat. No. 7,957,524, dated Apr. 19, 2012.

U.S. Patent and Trademark Office, "Action Closing Prosecution (37 CFR 1.949)" Reexamination Proceedings regarding U.S. Pat. No. 7,957,524, Aug. 30, 2012.

U.S. Patent and Trademark Office, "Office Action In Inter Parties Reexamination," U.S. Patent and Trademark Office's Control No. 95/000,649, dated Apr. 19, 2012.

"Amendment" filed Jun. 19, 2012 in response to "Office Action In Inter Parties Reexamination,"U.S. Patent and Trademark Office's Control No. 95/000,649.

U.S. Patent and Trademark Office, "Action Closing Prosecution," U.S. Patent and Trademark Office's Control No. 95/000,649, Aug. 30, 2012.

"Amendment" filed Oct. 1, 2012 in response to "Action Closing Prosecution," U.S. Patent and Trademark Office's Control No. 95/000,649.

U.S. Patent and Trademark Office, "Notice Re Defective Paper In Inter Parties Reexamination," U.S. Patent and Trademark Office's Control No. 95/000,649, Dec. 19, 2012.

"Amendment" filed Jan. 22, 2013 in response to "Notice Re Defective Paper In Inter Parties Reexamination," U.S. Patent and Trademark Office's Control No. 95/000,649.

U.S. Patent and Trademark Office, "Right of Appeal Notice," U.S. Patent and Trademark Office's Control No. 95/000,640, Jun. 7, 2013.

U.S. Patent and Trademark Office, "Notice of Intent to Issue Inter Partes Reexamination Certificate," U.S. Patent and Trademark Office's Control No. 95/000,649, Aug. 16, 2013.

* cited by examiner

PROTECTIVE COVERING FOR AN ELECTRONIC DEVICE

CROSS-REFERENCE TO RELATED APPLICATIONS

This application claims the benefit of U.S. Utility application Ser. No. 11/681,665 entitled PROTECTIVE COVERING FOR AN ELECTRONIC DEVICE and filed Mar. 2, 2007, which claims the benefit of U.S. Provisional Application Ser. No. 60/778,339 entitled PROTECTIVE COVERING FOR AN ELECTRONIC DEVICE and filed Mar. 2, 2006, which applications are incorporated by reference in their entirety.

BACKGROUND OF THE INVENTION

1. The Field of the Invention

The present invention relates to protective coverings. More particularly, embodiments of the invention relate to systems and methods for covering or shielding electronic devices with thin films including plastic films.

2. The Relevant Technology

Advances in many technology areas have resulted in a proliferation of electronic devices. Many of these devices are portable in nature. Cellular telephones, digital music (e.g., MP3) players, personal digital assistants, satellite radios, laptop computers and portable video/picture players, are examples of electronic devices in use today.

Many of these devices have multiple functions. Some cell phones, for example, are also capable of storing and playing digital music. Some digital music players also have the ability to store digital pictures and video. Many devices also provide their users with various programs such as calendaring applications, email applications, and word processing applications. The increasing versatility and functionality of electronic devices has only led to further reliance on these devices.

The size, versatility, and portability of these devices provides significant advantages. At the same time, and because these devices are electronic in nature, there are some inherent weaknesses that are difficult to overcome. For example, many of these devices have screens that can be scratched or damaged. Often, this type of damage can occur during normal use of the device. Few people enjoy looking at a scratched or damaged screen for many reasons. First of all, a scratched screen is not pleasant to view. In addition, the scratch or damage may actually interfere with the ability of a user to see the displayed images or text. In general, a scratched or damaged screen diminishes the use and value of the device to the user. It is also possible for the body or housing of the device to become damaged or otherwise scratched during use and many users want their devices to retain their original look and feel as long as possible.

Because these devices are used frequently, it is likely that they will be dropped, banged against other objects, and receive other types of abuse, whether deliberate or accidental. In fact, most of the abuse that these devices receive is unintentional. Nonetheless, the damage these devices receive over time can diminish their value and reduce their usability. In particular, a scratched screen is unsightly, may interfere with the user's visual experience (pictures and videos may be hard to see, text may be hard to read, etc.).

When a device is initially purchased, the screen is often covered by a piece of plastic that has a static adherence to the device. This covering is only meant to provide protection during shipping and is supposed to be removed. It is easily removed and typically includes a tab specifically for removal.

There are some existing screen coverings or protective shields in use today. However, the protection afforded by these screens is temporary and the protection provided is limited for several reasons. For example, conventional screen coverings wear out rather quickly and need to be replaced often. This is expected and these types of coverings are often sold in groups. Some of these coverings do not adhere to the screen, but slip into place and are held loosely over the screen.

Conventional screen coverings themselves are subject to scratches and the like as well. One significant drawback of some conventional coverings is that they begin to separate from the device at the corners and become deformed. As the edges begin to fray or become separated from the device, the appearance bothers the user and the cover is usually removed. In addition, conventional screen coverings are unable to protect the entire device and are typically limited to the screen of an electronic device. There is therefore a need to protect electronic devices including screens of electronic devices.

BRIEF SUMMARY OF THE INVENTION

These and other limitations are overcome by embodiments of the invention which relate to systems and methods for protecting devices. More particularly, embodiments of the invention relate to body covers including plastic films that adhere to surfaces of a device for which protection is desired. The film for a device is typically transparent or clear and, once applied, is substantially unnoticeable. Further, the film may adhere naturally to surfaces of a devices, or adhere using an adhesive. The adhesive may adhere to the device or may include pressure bonding and/or temperature bonding in some instances. Embodiments of the invention further contemplate a solution that is used during the application process to ensure that the film properly adheres to the device. The solution can be applied to the adhesive on the film and this permits the film to be properly positioned on the device prior to full adhesion of the film to the device. The solution may also make it easier to remove air bubbles from underneath the film.

A body cover is one embodiment of a film that is used to protect more than a screen of a device. A body cover protects other surfaces and/or aspects of the device. A body cover ensures that the original look of the device is protected. Further, the body cover is typically configured to lay flat against the surface of the device including surfaces such as curves, sloping surfaces, edges, discontinuities and the like or combinations thereof.

In one embodiment, a body cover can include multiple films. For example, a first film may cover a first surface of a device such as the front surface. A second film of the body cover may protect a second surface of the device such as the back and/or the sides. Further, the first or second films may be configured (such as by cutting or with slits/cuts) that enable the film to lay flat against the surface of the device by accounting for surfaces that are not flat (e.g., corners, sloping surfaces, edges including rounded edges, lips, and the like). Also, the first or second film may be designed to allow for ports or other aspects of the device that may be used for other purposes such as communication with another device.

A body cover or a single film may also have cutout areas that ensure that the film does not impede some functionality of the device and that does not reduce the effectiveness of the body cover. For example, a user interface on a device that is capable of movement (e.g., rotation, depression) may correspond to a cut out area. If the movable user interface were covered with a single film along with other surfaces of the device, then use of the user interface may be degraded and may cause the film to separate from the surface or make it difficult to use the user interface. At the same time, a body cover may also include a separate film for the user interface, thereby avoiding these problems while providing protection to the user interface or other aspect of the device and without interfering with operation of the user interface or other aspect of the device.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
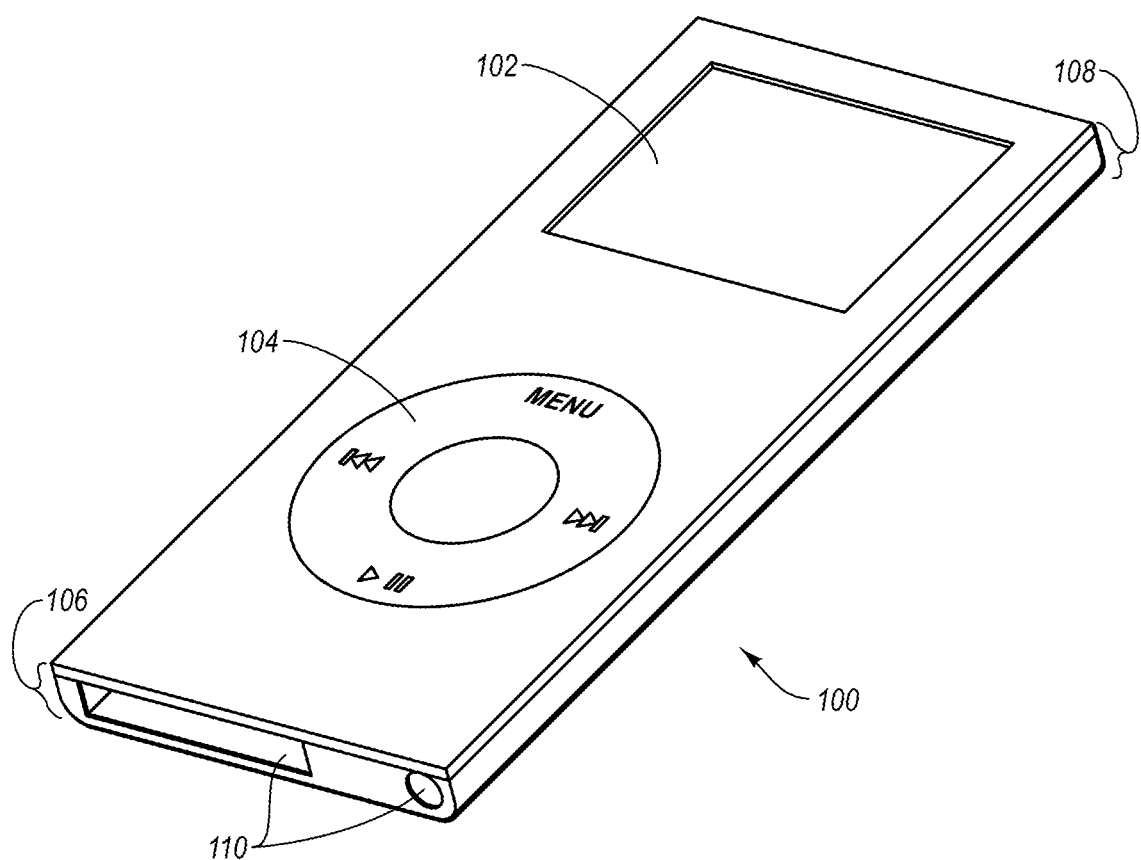
FIG. 1 illustrates an exemplary perspective view of an electronic device that includes a screen and a user interface.

Embodiments of the invention relate to protective coverings and more particularly, to thin film or plastic coverings or shields for electronic devices including portable electronic devices. Embodiments of the invention relate to protective coverings for the screens of electronic devices. Other embodiments of the invention provide protection to other surfaces of the various devices that may include the screen or display of the device. Embodiments of the invention therefore relate to device protectors (also referred to herein as covers, shields, body covers, or body shields) that may include more than one film in addition to films that protect screens. A body cover may include one or more separate films that are configured to protect the outer surfaces of the device, which may include the screen.

Because the surfaces of the bodies or the housings of electronic devices are not flat, but may have corners, sides, edges, bulges, protrusions, depressions, discontinuities, lips, shelves, etc., embodiments of the invention are configured such that the film does not bunch or wrinkle. This can be achieved by selectively cutting the film or by dividing the body covering into multiple pieces. For example, the film for a battery cover may be separate from other films of a body cover for other surfaces of the device. This ensures that the surface of the battery cover is protected without interfering with the operation of the device.

When the films of a body cover are properly applied to various surfaces of a device, the films are preferably smooth and flat against the various surfaces of the device and are substantially free of air bubbles, which may become trapped between the film and the surface of the device. For example, if a flat and substantially rectangular film is applied to a corner of a device, the film will bunch and not lay flat on the surfaces of the device. In addition to being unsightly, bunching and/or air pockets may adversely cause the film to separate from the device and bother the user. Further, the film is susceptible to peeling away from the device surface wherever bunching occurs. Embodiments of the invention eliminate these problems.

Embodiments of the invention include films that are cut or formed such that the surfaces of the device are substantially covered without bunching and substantially without creating air pockets. The cuts made to the various films included in a body cover for a device are configured to account for curved surfaces in addition to corners, edges, depressions, bulges, and the like or any combination thereof. In some embodiments, the film can wrap around edges or corners without bunching or creating air pockets or bubbles. The film may be cut, for example, if a particular edge of a device is not straight or is curved. Such a cut may be used when a portion of the surface can be viewed as a ramp in one embodiment. Alternatively, the film may be separated into multiple pieces that can be applied separately to the device.

FIG. 1 illustrates an exemplary device and is intended to be representative of other devices. The device 100 represents, by way of example and not limitation, cellular telephones, digital music players, audio recorders, laptop computers, personal digital assistants, satellite radios, watches, GPS devices, bike computers, digital cameras, heart rate monitors, portable DVD players, dive computers, and the like or any combination thereof. Embodiments of the invention are further not limited to electrical devices, but can also protect other devices that may or may not have screens or displays.

The device 100 typically includes a screen 102, although some devices may not include a screen. Embodiments of the invention can protect a screenless device as well. In this example, the screen 102 may be flush with a top surface of the device 100 or may be inset with respect to the top surface of the device 100. The relative position of the screen 102 with respect to the corresponding surface may have an impact on how the protective cover is prepared for application on the device 100. In general, embodiments of the invention can be adapted for devices that have surfaces with discontinuities (such as the boundaries between an inset screen and the corresponding surface of the device 100 or between buttons and the corresponding surface of the device 100). Typically, the discontinuities are accounted for by forming cutout areas in the films of the body cover. This ensures that each film can lay flat against a portion of a surface and also ensures that the functionality of the device 100 corresponding to the cutout area is not impaired. Further, a separate film may be used to protect the area of the device 100 corresponding to the cut out area. The cutout portion may be used to protect the corresponding surface area. In one embodiment, the cutout film may be used on a cut out area.

By using multiple films in a body cover, protection is achieved for each covered surface without interfering with operation of the device. For instance, using a separate film for a user interface that moves ensures that the film moves with the user interface without affecting the film applied to the other surfaces of the device.

The device 100 also includes surfaces or sides 106 and 108 and other sides not shown. The device 100 also has a front side/surface and back side/surface. In this example, the side 106 has ports 110. The ports 110 enable the device 100 to connect to another device. For instance, the device 100 may be rechargeable and connects to an external power supply for recharging through one of the ports 110. Alternatively, the ports 110 or one of the ports 110 may enable the device 100 to exchange data with another device such as a host computer. One of skill in the art can appreciate that the form factors for electronic devices can widely vary. With the benefit of the teachings contained herein, one of skill in the art can prepare and apply a protective cover to any electronic device.

The device 100 also includes a user interface 104. Often, the user interface 104 and the screen 102 work together to enable a user to use the device 100. In the case of a digital music player, for example, the user interface 104 can be used to select a particular song or playlist and the screen 102 can visually reflect the actions of the user. The device 100 may also display album art or other images on the screen 102 during playback of the selected song or playlist.

Figure 2:
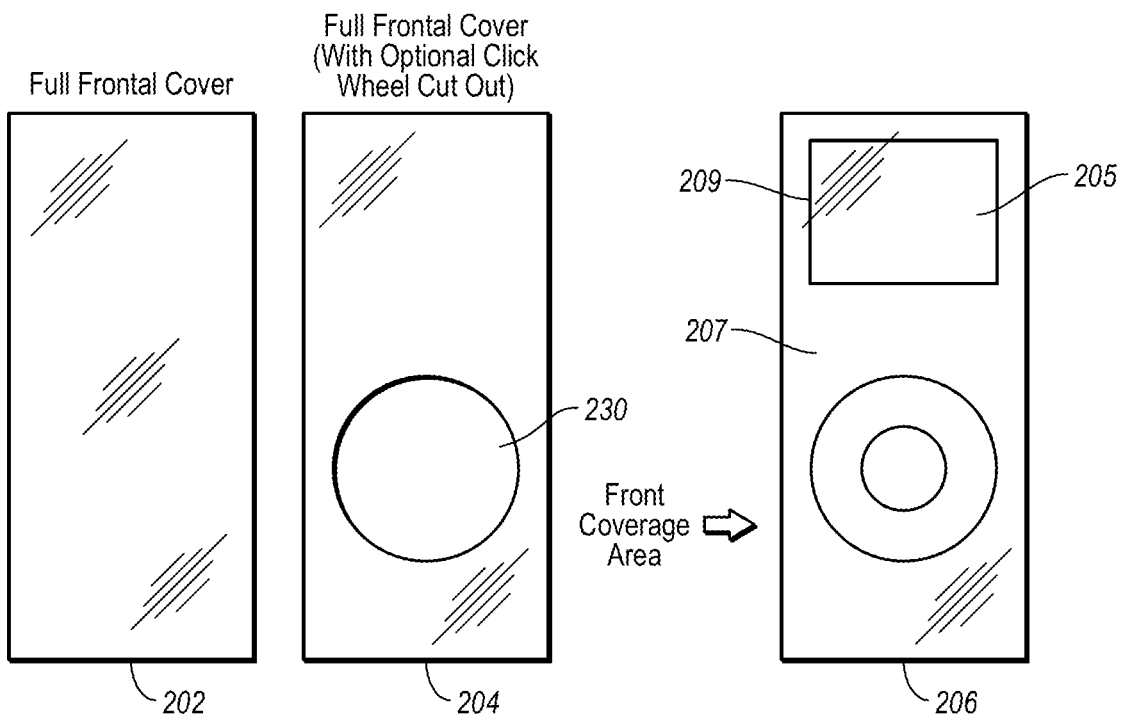
FIG. 2 illustrates exemplary covers that include multiple films that are fixed to an electronic device.
Figure 2:
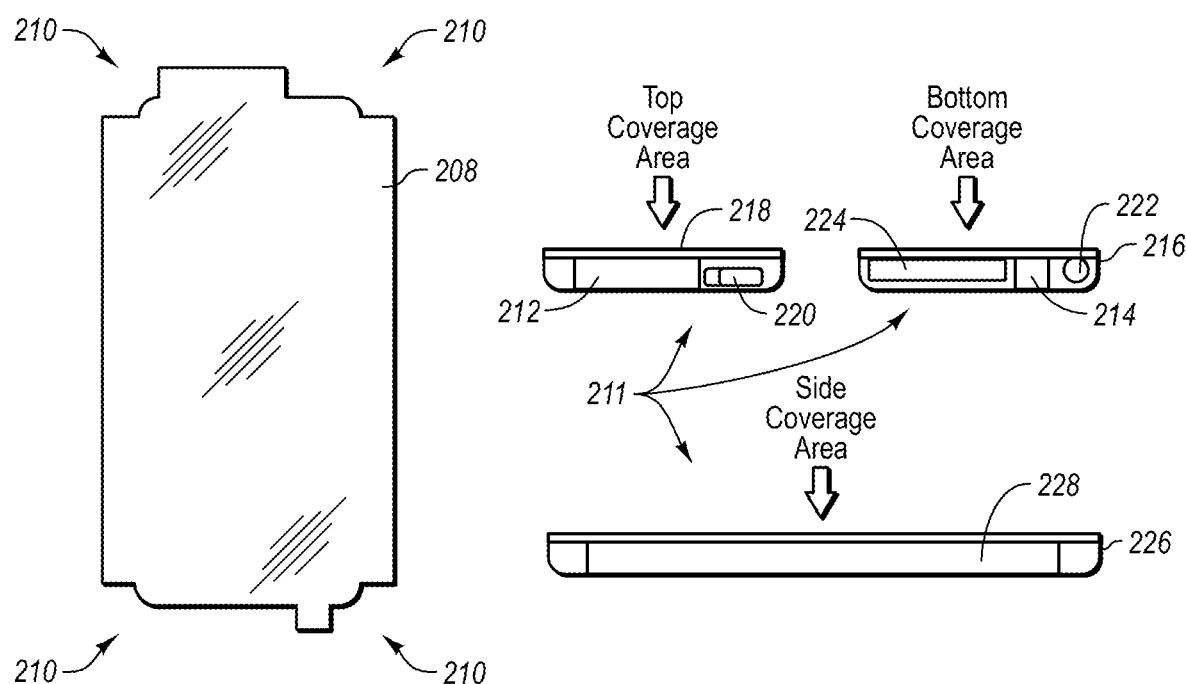

FIG. 2 illustrates one embodiment of a protective cover or of a body cover that includes one or more films for an electronic device such as the device 100 in FIG. 1. The protective cover illustrated in FIG. 2 includes two separate films in this example. As discussed below, however, a body cover may include a single film. FIG. 2 further illustrates different configurations of the films of the protective body cover illustrated in FIG. 2. In one embodiment, the top surface of the device is protected by the film 202 and the bottom surface of the device is protected by the film 208. In another embodiment, the top surface is protected by the film 204 and the bottom surface is covered by the film 208.

One difference between the film 202 and the film 204 is that the film 204 includes a cutout area 230 (or a plurality of cutout areas) that accommodates the user interface of the device. When the film 202 is applied to a device, the user interface is protected by the film 202 and the ability of the user to interact with the device may not be inhibited by the presence of the film 202. The film 204, in contrast, provides a user with the option of protecting the screen of the device as well as some of the top surface area of the device without covering the user interface. If desired, a film matching the cutout area 230 can be applied specifically to the user interface.

The device 206 illustrates the protective cover applied to a device such as illustrated in FIG. 1. Because the screen 205 of the device 206 is flush with the top surface, the film 202 or 204 can be applied without creating an air pocket at the boundary 209. Even in cases where the screen is slightly inset, a single film 202 or 204 can still be used to cover the screen and other portions of the surface of the device 206.

An air pocket at the boundary 209 could cause the film 207 to separate from the device 206 at some point. If the screen 205 is inset with respect to the top surface of the device 206 more substantially, then the film 207 may include two separate films. The first film would be configured (such as by cutting) to fit the screen 205 while the second film would adhere to the top surface of the device 206. The second film would have a cutout area 230 for the screen 205 of the device 206. This enables the film 207 to lay flat on the device 206 without creating an air pocket at the point where the inset screen 205 and top surface meet. In one embodiment, the cutout area 230 for a device 206 with an inset screen 205 can be configured to curve down and provide additional protection to the walls of the inset area. This can be achieved, for example, by cutting short slits at each corner such that the film 207 can fold flatly against the surface of the device 206 as the surface slopes down to the inset screen 205. In another embodiment, the film 207 may simply be applied over both the screen 205 and the surface. The strength of the adhesive prevents the film 207 from peeling away.

The film 208 that covers or protects a back side of a device 206 has an outline that is cut or shaped to adapt to various aspects of the device 206. The corners 210 of the film 208, for example, are formed or cut such that bunching of the film 208 or air pockets are not formed as the film 208 is applied to more than one side or surface of the device 206 including edges and corners. The film 208 is typically flexible such that it can wrap around corners or otherwise adapt to the surface of the device 206 while still being flat against the surface of the device 206.

The side coverage 211 illustrates how the film 208 covers sides of the device 206 in addition to covering the back surface. The side 218 is covered by the film 212. In other words, the edges of the film 212 are prepared to cover the side 218 of the device 206. Preparing the edges can include cutting the edges to account for device ports, surface slopes, surface discontinuities, and the like or any combination thereof. Thus, the film 208 wraps around the edge of the device 206 formed by the back side and the side 218. In this example, the film 208 has been formed or cut such that the port 220 remains accessible to a user. Similarly, the ports 222 and 224 on the side 216 remain accessible after the film 208 is applied while covering a portion with the film portion 214. The side 226 illustrates the coverage of the film 208 on the side 226.

In this example, the film 208 has been designed to wrap around certain edges of the device 206 and cover at least a portion of the sides while the film 202 does not wrap around any edges of the device 206 and covers the top surface of the device 206. One of skill in the art can appreciate that the one or both of the top 202 and 205 and bottom films 208 can wrap around edges of the device 206. Thus, in FIG. 2, the film 202 or 204 is only applied to the top surface of the device 206 and none of the film 202 or 204 folds over to wrap around and edge of the device 206 and cover a portion of the sides of the device 206.

Figure 3:
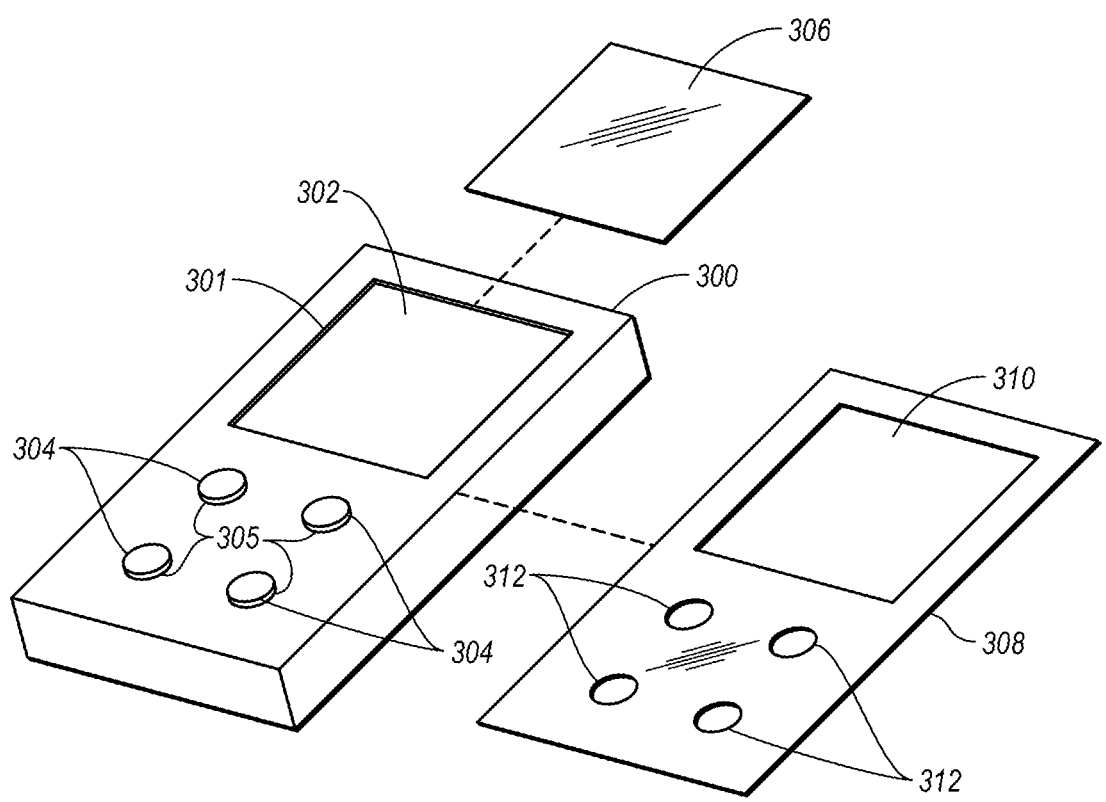
FIG. 3 illustrates exemplary films with cutout areas as well as being configured for discontinuities in the surface of a device.

FIG. 3 illustrates a device 300 having a screen 302 that is slightly inset from the top surface of the device 300. The device 300 also includes a user interface that includes buttons 304. As a result, the top surface has discontinuities at the boundary 301 where the housing meets the screen 302 and at the boundary 305 where the buttons 304 extend out from the surface of the device 300. In this example, the film used to protect the top surface of the device 300 would include at least two pieces. The film 306 is cut to fit the screen 302. When the film 306 is applied to the screen 302, no air pockets are formed and the film 306 lays flat against the screen 302. The film 308 includes a cutout area 310 to account for the inset screen 302 and cutout areas 312 to account for the buttons 304. When the film 308 is applied to the device 300, it also lays flat without creating air bubbles or bunching.

One of the advantages of the cutout areas 310 and 312 is that the films 306 and 308 can rest flat against the top surface of the device 300. Using two films to protect the top surface prevents air bubbles from forming at boundaries 301 and 305 or other discontinuities. Also, the cutout areas 312 ensure that the film portion 308 does not interfere with the operation of the device 300. Further, the films 306 and 308 are transparent and when applied as described they are not very noticeable.

Figure 4:
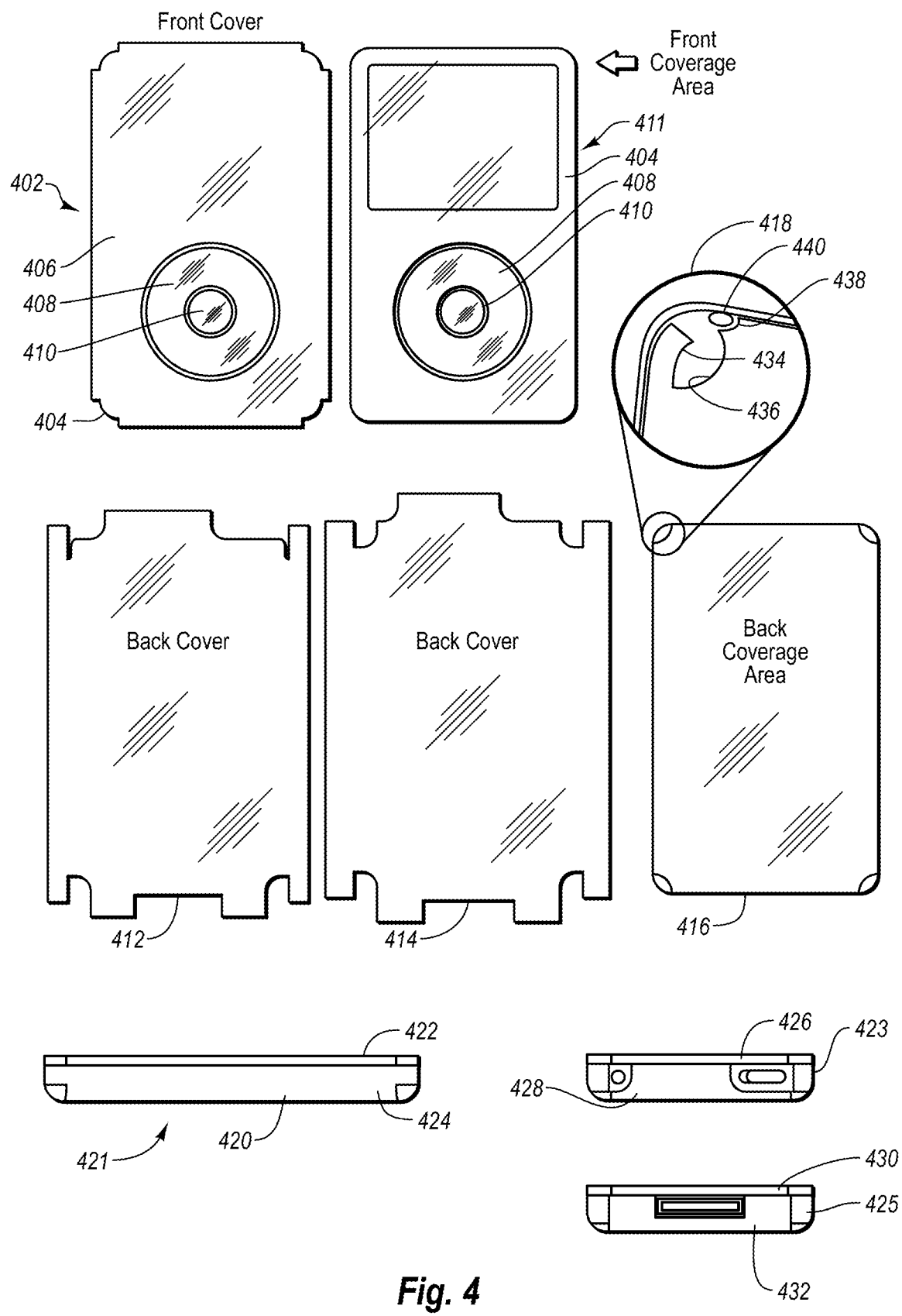
FIG. 4 illustrates another embodiment of films where the corners of the film include cuts to ensure that the films lay flat against the surface of the protected device.

FIG. 4 illustrates another embodiment of a protective film for a device. In this example, the film 402 includes the films 406, 408, and 410. The film 402, when applied to a top surface of a device, is illustrated at 411. The film portion 404 covers the screen and some of the rest of the top surface. The films 408 and 410 cover different parts of the user interface of the device. As previously described, one or both of the films 408 and 410 can be omitted. Further, the films 408 and 410 correspond to cutout areas in one embodiment.

In this example, the film portion 404 also covers some of the sides of the device by wrapping around the edges. The side coverage 421 illustrates the coverage provided by the film 404 (or more generally the film 402) and the film 412 or 414 (the films 412 and 414 are for different models of the same device) to the sides of a device. The portion of the side 420 covered by the film 422 is represented by the film 422. Similarly, the portions of the sides 423 and 425 covered by the film 402 is represented, respectfully, by the film 426 and 430. The portions of the sides 420, 423, and 425 covered by the film 412 or 414 are represented, respectfully, by the films 424, 428, and 432.

In this example, the corners of the device being protected are rounded and may have sloping surfaces. The blow up 418 illustrates a corner of a device and shows that the film 414 is cut or shaped such that edges and corners of the device can be substantially covered without bunching or forming air pockets. The film 414 includes a tab 434 that can wrap around a corner of the device regardless of the specific shape of the device. The cut 436 enables the film 414 to lay flat on the surface of the device as the film wraps around the corner shown in blow up 418. The cut 438 ensures that the user has access to the port 440.

When a film is designed for a device either as a body cover or for a specific portion of the device such as the screen, the device is first examined to identify locations that may require attention (such as discontinuities, corners, edges, user interfaces, screens, sloping surfaces, rounded edges or corners, etc.). Further, the film can be designed with various options in mind. For example, portions of the device that correspond to cut out areas in a film can be provided with a separate film if desired.

For a body cover for a given device, at least two films may be needed, although a single film may be provided as a body cover for some devices. Typically, one film is prepared for a top or front surface of the device and a second film is prepared for the bottom or back surface of the device. One of the first or second film may also be configured to protect sides of the device. The specific configuration of the films may depend on the shape of the device. For example, often the top film and/or the bottom film will wrap around the sides of the device such that coverage or protection is provided to the sides of the device. Alternatively, separate films could be prepared for the sides. In addition, the corners or edges of the two films are cut or shaped to account for corners, sloping surfaces, etc., and to insure that the films lay flat against these types of surfaces of the device when applied to the device.

Next, cutout areas are identified and appropriate cuts are made in the films. This may include, for example, a cutout area for the user interface. Note that the film that is cut out can optionally be applied separately as a film for the user interface or other aspect of the device. In FIG. 2, for example, the user interface can be covered with a film or not covered with a film. Then, the corners of the films are typically examined. The corners of the films are cut to ensure that the films will lay flat against the device even at the corners as previously described. This may include forming tabs or making other cuts to account for sloping surfaces, three dimensional corners, rounded corners, etc. Also, any ports on the device are considered and the films are cut such that the ports remain accessible to the user.

In another embodiment of the invention, the body covering includes a solution that may be used during application of the body covering to a device. The solution is designed to improve the ease with which the body covering is applied as well as improve the adhesion of the body covering to the device. The solution may be applied to the film prior to application. The solution may provide additional time for the user to properly position the film before the adhesive fully sticks to the device. The solution also enables trapped air bubbles to be removed as the film adheres to the surface of the device. The solution may be, by way of example only, a mixture of soap and water. In effect, the film delays the adhesion of the film to the device and improves customer satisfaction by providing a user with more time to properly position each film of a body cover on a device.

The film or body cover may be, by way of example only, a thermoplastic elastomer or a urethane plastic film, which combines the mechanical and physical properties of rubber with the advantages of thermoplasticity. Other examples of the film may include a polyether urethane, a polyester urethane or an aliphatic urethane.

In one embodiment, the film has properties of rubber and of plastic. With these properties, the film has excellent abrasion resistance. Further, application of the film to a scratched surface may hide the scratches or make the scratches less noticeable.

Embodiments of the film have a memory than enable the film to be elongated and then return to its original shape. The film can be soft and malleable, yet have high tensile strength. Examples of the film can have a hardness that ranges from very soft to stiff, by way of example only from Shore 25A-Shore 25D in a durometer range. Further, the film has good flexibility over a wide durometer range. This hardness or softness of the film to absorb impact (stretch or deform) and then return to an original shape provides additional protection to a protected device. Thus, embodiments of the invention relate to films that have both abrasion resistance and impact resistance. The film may have a thickness that is on the order of 8 mils. In another example, the film may have a thickness that is on the order of 6 mil or on the order of 6-8 mil or greater. This thickness may not include the thickness of the adhesive that is included with the film. One of skill in the art can appreciate that thinner or thicker films may be used. These properties make the films of the present invention provide excellent protection as a body cover for a device. In some embodiments of the invention, the films may not contain plasticizers and are therefore not subject to brittleness.

Embodiments of the film have elastic properties such that it may stretch or deform when a stress is applied and then return to the original shape when the stress is removed. The film can be applied or bonded to a device surface using an adhesive, by heat bonding, pressure bonding, and the like or any combination thereof.

Figure 5:
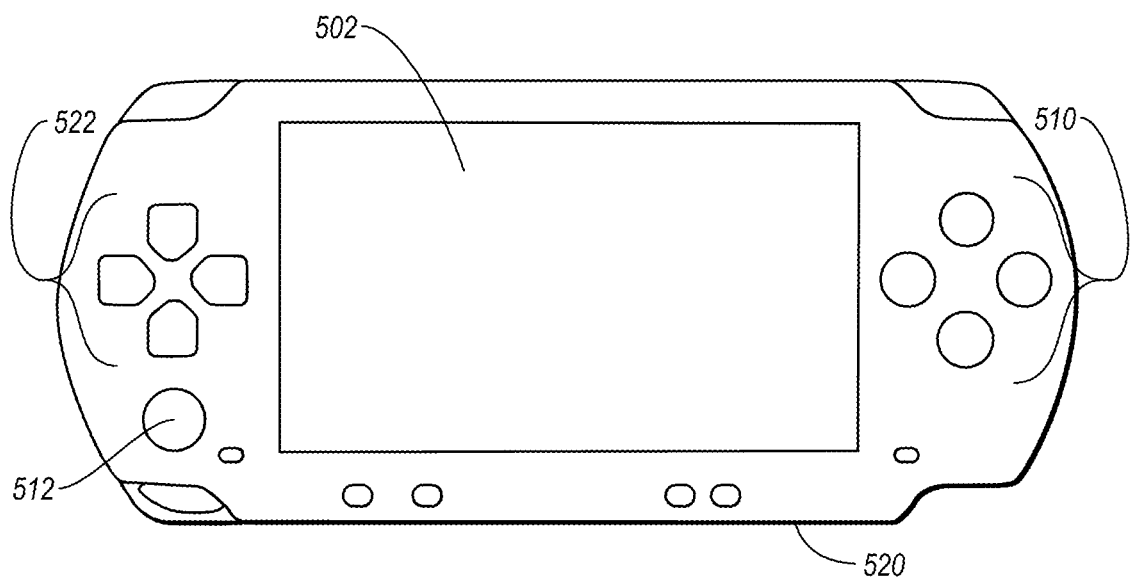
FIG. 5 illustrates another embodiment of a body cover for an electronic device.
Figure 5:
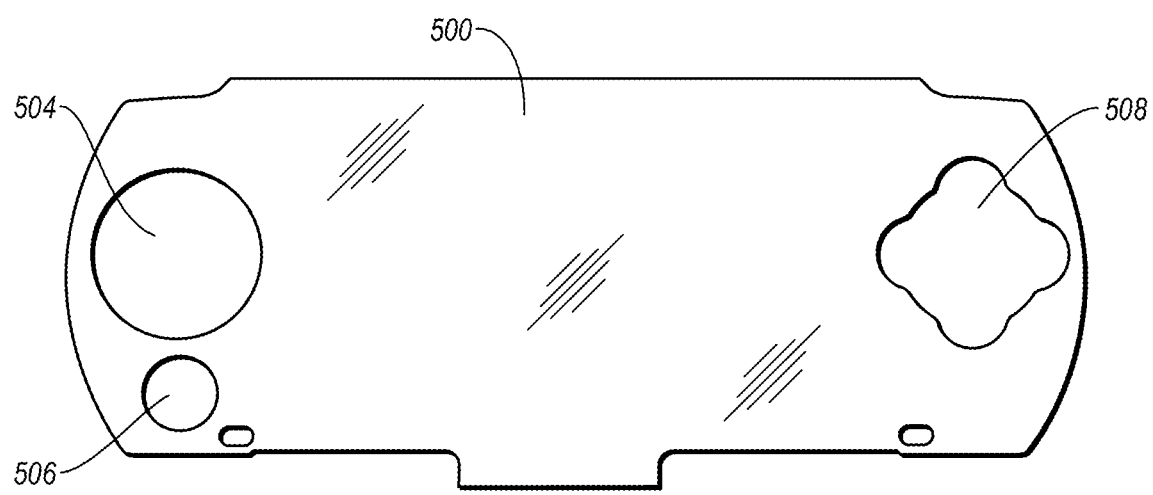

FIG. 5 illustrates a body cover for a device 520. The device 520 includes a display 502 and a user interface in the form of buttons 510 and 512. The cutout areas 504, 506, and 5085 may be formed in the film 500 to account for the buttons 510 and 512. Thus, the film 500, when applied to the device 520, covers the top surface of the device 520 including the display 502 without interfering with the user interface. The film 500 may account for speaker openings, and the like as well.

Figure 6:
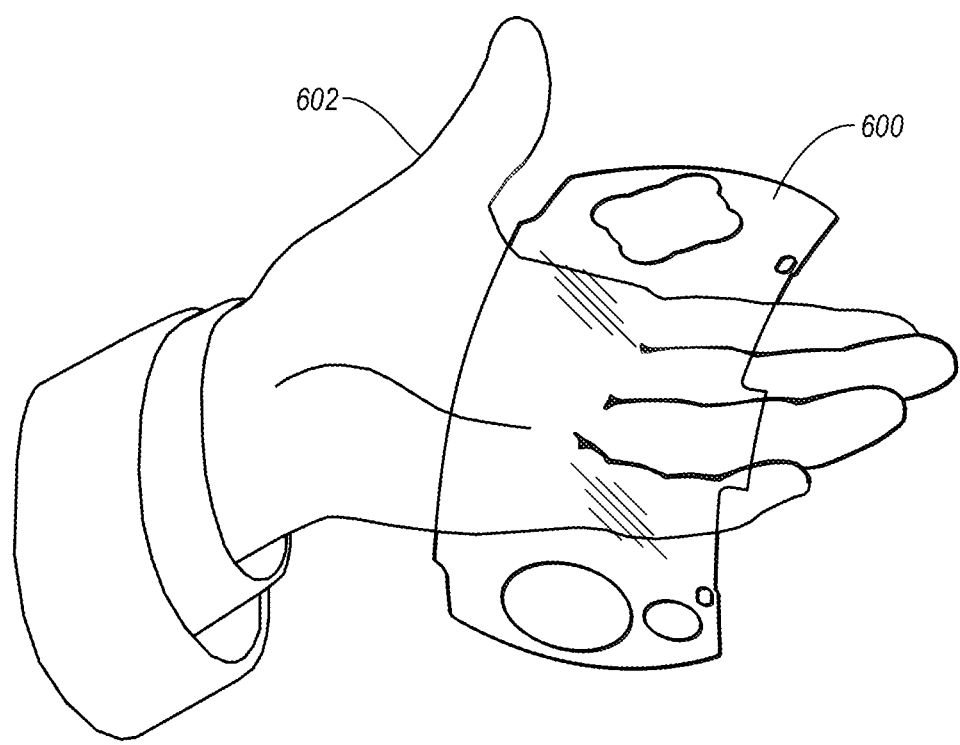
FIG. 6 illustrates aspects of an exemplary film.

FIG. 6 illustrates a film 600 held in a hand 602. The film 600, prior to being applied to a device, is flexible or malleable. The film 600 (as well as other films discussed herein), for example, may have elongation properties of greater than 400% and tensile strengths on the order of 9200-9600 psi. Embodiments of the invention are not limited to these properties, however, and includes films with different properties or with different ranges of the same properties. In addition to elongation and tensile strength, the hardness of the film can vary as described previously. Also, the tensile strength and elongation of the film 600 may depend on the thickness of the film 600.

Figure 7:
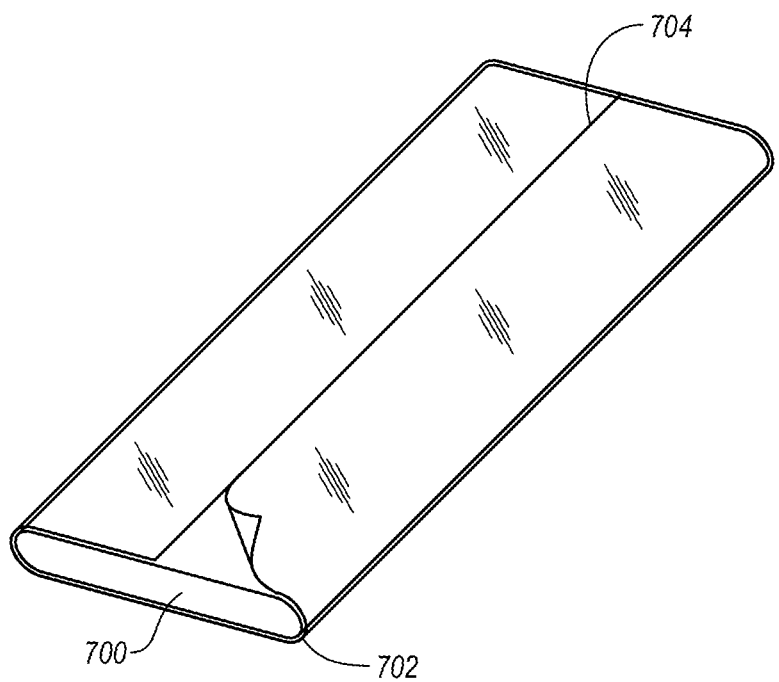
FIG. 7 illustrates a body cover for a device.

FIG. 7 illustrates another embodiment of a body cover. This example illustrates the flexibility of the film in accordance with embodiments of the invention. In this example, a single film 702 is applied to the device 700. The device 700 has a body with a shape that includes rounded sides as well as a display. The film 702 wraps completely around the device 700 as a single film 702. The line 704 identifies where the two ends of the film 702 meet, preferably on the back of the device 700. Further, the ends of the film 702 may be cut to provide clear visibility to any icon or marking on the device 700.

In this example, the body cover includes at least one film 702 that wraps around a device 700 and that adapt to the shape of the surface being covered. Thus, the flexibility of the film 702 enables the film 702 to wrap around the device 700 to provide protection to all or most surfaces of the device 700. If desired, the ends of the device 700 may not be covered by the film 702 or may be covered by separate films. The surface of the device 700 may include a screen as well as other portions of the front surface, the back surface, the sides, and the like or any combination thereof. The film 702 can lay flat against contours of the body surface without bunching. The film 702 is substantially transparent etc. The film 702 can optionally include a cutout area to account for user interface, ports, and the like. The film 702 is a body wrap that covers substantially all of the device 700's surfaces. In this example, however, the ends of the device 700 are not covered. However, the film 702 and have taps that fold down over the ends, while accounting for ports, etc.

In another embodiment, the display of the device 700 may be slightly inset. In this instance, a single film 702 can be used to cover the display as well as additional surfaces of the device 700. The film 702 typically includes a strong adhesive that ensures that the film 702 does not peel away from the screen. Advantageously, the film 702 also prevents dirt or grime from accumulating at the edges of the screen or display.

Figure 8:
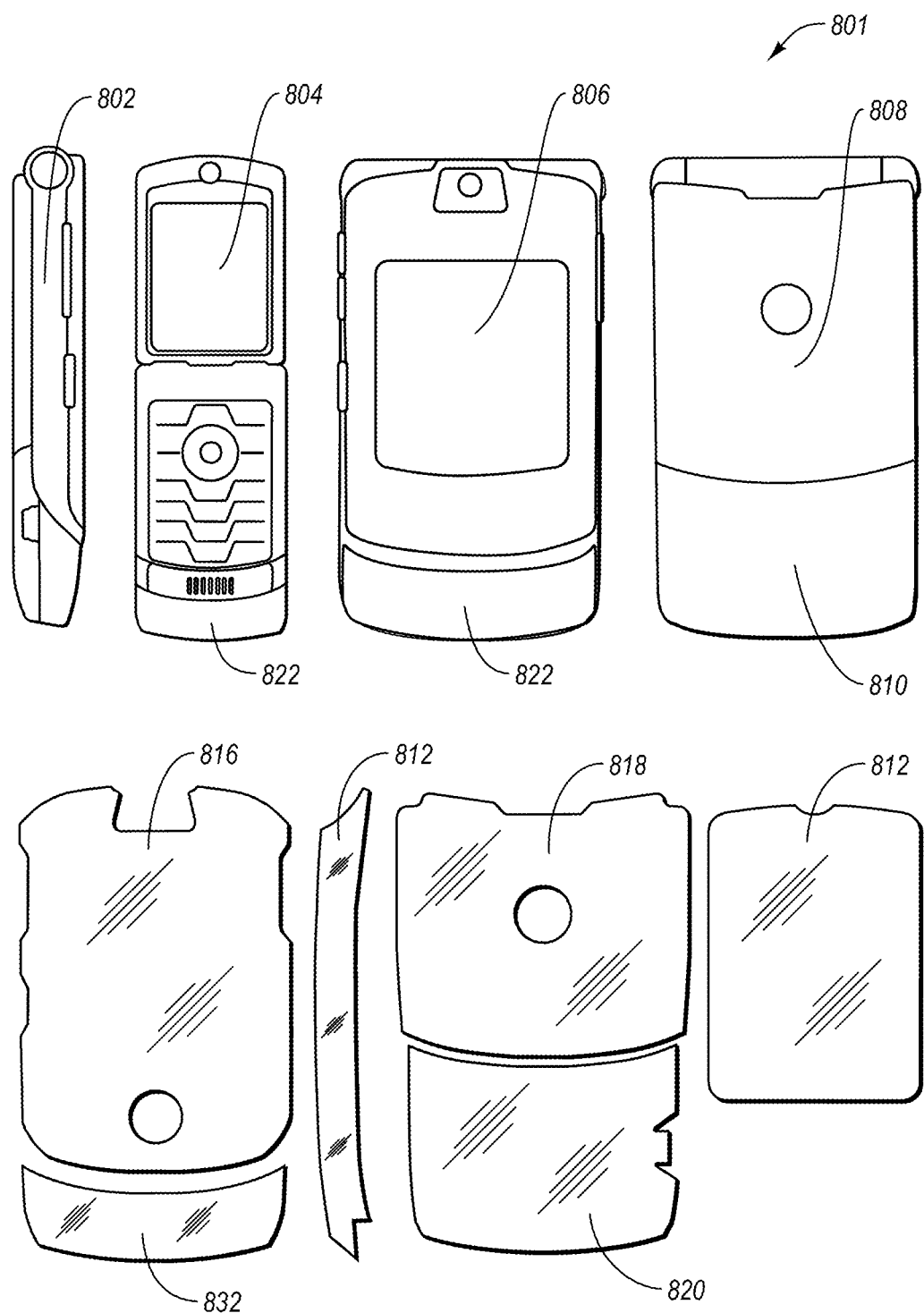
FIG. 8 illustrates another embodiment of a body cover for an electronic device.

FIG. 8 illustrates another embodiment of a body cover for a device such as a cellular telephone. In this example, the body cover includes multiple films. The various films are formed or cut specifically for various surfaces of the device. For example, the film 812 is applied to the surface 802. The film 816 is applied to the surface 806. The film 832 is applied to the surface 822. The film 818 is applied to the surface 808. The film 820 is applied to the surface 810. The film 814 is applied to the display 804.

As illustrated in FIG. 8, the films 812, 814, 818, 820, 816, and 832 are selected such that they protect the surfaces of the device without interfering with the operation of the device. The device 801 is a clamshell device, includes a battery cover, and has other features. The films are selected to ensure that the battery can be changed without having to be removed.

The films may also include cutout areas to account for surfaces of the device that may not be ideal for adhesion. For instance, the device 801 may include a marking that has ridges, an uneven surface, and the like. A corresponding cutout area may be formed in the corresponding film to ensure good adhesion of the film to the respective surfaces. The markings on the device 801 may therefore not be covered by a film.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A protective film for an electronic device that includes an edge surrounding a front surface of the electronic device and separating the front surface from a periphery or a rear surface of the electronic device, the protective film comprising:
   a front member comprising a film formed to conform to a contour of substantially an entirety of the front surface of the electronic device, including a display of the front surface of the electronic device, and to contours of at least a portion of an edge and corners adjacent to the front surface of the electronic device, an entirety of the front member, including adhesive material on an interior surface of the front member at locations that will secure the front member directly to the display, being transparent to enable viewing of the display of the front surface of the electronic device through the front member; and
   a rear member comprising a film formed to cover and to conform to a contour of the rear surface of the electronic device.

2. The protective film of claim 1, wherein the front member includes one or more apertures capable of accommodating a speaker of the electronic device.

3. The protective film of claim 1, wherein edges of the front member include cutouts capable of providing accessibility to one or more features on the edge of the electronic device.

4. The protective film of claim 1, wherein an adhesive material on an interior surface of the rear member is capable of adhering the rear member to the rear surface of the electronic device.

5. The protective film of claim 1, wherein each of the front member and the rear member has a thickness of 8 mils or less.

6. The protective film of claim 1, wherein the rear member is formed to conform to contours of at least another portion of the edge and the corners adjacent to the rear surface of the electronic device.

7. The protective film of claim 6, wherein the rear member includes one or more cutouts capable of providing accessibility to one or more features on the edge of the electronic device.

8. The protective film of claim 6, wherein the front member and the rear member are shaped to substantially cover all surfaces of the electronic device.

9. The protective film of claim 1, wherein the rear member only covers the rear surface of the electronic device.

10. The protective film of claim 1, wherein each of the front member and the rear member is stiff.

11. The protective film of claim 1, wherein each of the front member and the rear member comprises a material that retains its shape.

12. The protective film of claim 1, wherein each of the front member and the rear member comprises:
a urethane;
a thermoplastic elastomer;
a polyether urethane;
a polyester urethane; or
an aliphatic urethane.

13. A protective film for an electronic device, comprising:
a body cover including members that, throughout their entireties, are substantially transparent, including:
a front member formed to cover and to conform to a shape of substantially an entirety of a front surface of the electronic device, including a screen viewable from the front surface, at least a portion of an edge continuous with the front surface, and at least portions of corners continuous with the front surface, the front member capable of being adhesively secured to the front surface of the electronic device, including the screen; and
a rear member formed to cover and to conform to a shape of a rear surface of the electronic device, the rear member being entirely separate from the front member, the rear member capable of being adhesive secured to the rear surface of the electronic device.

14. The protective film of claim 13, wherein each of the front member and the rear member is stiff.

15. The protective film of claim 14, wherein each of the front member and the rear member comprises a material with shape memory such that each of the front member and the rear member will deform in response to an impact and then return to an original shape.

16. The protective film of claim 14, wherein each of the front member and the rear member comprises:
a urethane;
a thermoplastic elastomer;
a polyether urethane;
a polyester urethane; or
an aliphatic urethane.

17. The protective film of claim 14, wherein an adhesive is disposed on an interior surface of each of the front member and the rear member.

18. The protective film of claim 17, wherein the adhesive includes a pressure sensitive adhesive.

19. The protective film of claim 13, wherein the rear member is formed to conform to contours of at least another portion of the edge continuous with the rear surface of the electronic device and at least other portions of the corners continuous with the rear surface of the electronic device.

20. The protective film of claim 13, wherein the rear member is planar.

21. An electronic device assembly, comprising:
an electronic device including at least a front surface from which a screen is viewable, a rear surface opposite from the front surface, an edge surrounding at least a portion of the front surface, with transitions between differently oriented sections of the edge comprising corners;
a front protective film:
formed to conform to contours of substantially an entirety of the front surface of the electronic device, at least a portion of the edge of the electronic device continuous with the front surface, and at least portions of the corners of the electronic device continuous with the front surface;
adhesively secured to the front surface, including the screen, of the electronic device; and
substantially transparent throughout its entirety, including through an adhesive material adhesively securing the front protective film to the front surface, including the screen, of the electronic device; and
a rear protective film:
formed to conform to the rear surface of the electronic device;
adhesively secured to the rear surface of the electronic device;
substantially transparent throughout its entirety; and
separate from the front protective film.

22. The electronic device assembly of claim 21, wherein the electronic device comprises a portable electronic device.

23. The electronic device assembly of claim 21, wherein the rear protective film is also formed to conform to contours of at least another portion of the edge of the electronic device continuous with the rear surface, and at least other portions of the corners of the electronic device continuous with the rear surface.

24. The electronic device assembly of claim 21, wherein the rear protective film is only configured to conform to the rear surface of the electronic device.

25. A protective film for a device, comprising:
a stiff front protective member comprising a film capable of covering and conforming to a front surface of the device;
a transparent adhesive material on an interior surface of the stiff front protective member capable of adhesively securing the stiff front protective member to the front surface of the device, including a display of the electronic device;
a stiff rear protective member capable of covering a rear surface of the device; and
a transparent adhesive material on an interior surface of the stiff rear protective member capable of adhesively securing the stiff rear protective member to the rear surface of the device.

26. The protective film of claim 25, wherein at least one of the stiff front protective member and the stiff rear protective member includes at least one cutout for providing access to a feature of the device.

27. The protective film of claim 25, wherein the stiff front protective member and the stiff rear protective member, upon being positioned on the front surface and the rear surface of the device, comprise parts of a member-device assembly having substantially the same appearance as the device.

28. A protective film for an electronic device, the protective film comprising:

a front member comprising a film formed to cover and to conform to a front surface of the electronic device and to at least a portion of an edge adjacent to the front surface of the electronic device, the front member being stiff and including an interior surface coated with a transparent adhesive material capable of securing the front member to a display of the front surface of the electronic device; and a rear member comprising a film formed to cover and to conform to a rear surface of the electronic device, the rear member being stiff and including an interior surface coating with a transparent adhesive material.

29. The protective film of claim 28, wherein the front member and the rear member having thicknesses of 8 mils or less.

30. The protective film of claim 29, wherein the transparent adhesive material on the interior surface of the rear member enables the rear member to be secured to the rear surface of the electronic device.

31. The protective film of claim 25, wherein each of the stiff front protective member and the stiff rear protective member has a thickness of 8 mils or less.

* * * * *